US010704511B2

(12) United States Patent
Williams et al.

(10) Patent No.: US 10,704,511 B2

(45) Date of Patent: Jul. 7, 2020

(54) CLAMPED JOINT DEVICE

(71) Applicant: DENSO International America, Inc., Southfield, MI (US)

(72) Inventors: Mark Williams, Gaines, MI (US); Fadi Elias, Royal Oak, MI (US)

(73) Assignee: DENSO International America, Inc., Southfield, MI (US)

( * ) Notice: Subject to any disclaimer, the term of this patent is extended or adjusted under 35 U.S.C. 154(b) by 472 days.

(21) Appl. No.: 15/236,767

(22) Filed: Aug. 15, 2016

(65) Prior Publication Data

US 2018/0045149 A1 Feb. 15, 2018

(51) Int. Cl.

*F16L 33/08* (2006.01)
*F16L 27/107* (2006.01)
*F16L 21/08* (2006.01)
*F02M 35/10* (2006.01)

(52) U.S. Cl.

CPC ................ *F02M 35/10144* (2013.01); *F02M 35/10157* (2013.01); *F02M 35/10209* (2013.01); *F16L 21/08* (2013.01); *F16L 27/107* (2013.01); *F16L 33/08* (2013.01); *Y02T 10/144* (2013.01)

(58) Field of Classification Search

CPC ......... F16L 27/107; F16L 33/08; F16L 21/02; F16L 37/091; F16L 33/035; F16L 37/0847; F16L 37/098; F16L 37/0985; F16L 37/133; F16L 55/1157; F16L 37/04; F16L 37/084; F16L 37/0845; F16L 37/24; F16L 21/08; F16L 21/007; F16L 37/113; F16L 23/08; F16L 21/06; F16L 23/18; F02M 35/10144; F02M 35/10157; F02M 35/10209

USPC ............ 285/403, 252, 148.14, 148.2, 154.3, 285/288.6, 305, 290.3, 292.1, 309, 330, 285/331, 420, 307, 81, 82, 236, 408

See application file for complete search history.

(56) References Cited

U.S. PATENT DOCUMENTS 4,559,783 A * 12/1985 Ampferer ............... F02B 33/44 285/373
5,655,795 A 8/1997 Strnad et al.
6,749,815 B2 6/2004 Cash
2003/0075923 A1* 4/2003 Lepoutre .......... F02M 35/10144 285/330
2005/0189768 A1* 9/2005 Avram .................. F16L 21/065 285/419
2005/0264012 A1* 12/2005 Ignaczak ................. F16L 23/08 285/417
2009/0230675 A1* 9/2009 Densmore ............... F16L 21/08 285/236

FOREIGN PATENT DOCUMENTS

WO 2006137875 A2 12/2006

* cited by examiner

*Primary Examiner* — Zachary T Dragicevich
*Assistant Examiner* — William S. Choi

(57) ABSTRACT

A tubular seal is formed of an elastic material and equipped on the outer periphery of a first tube. A second tube is inserted in the tubular seal and connected with the first tube via the tubular seal. A clamp is in a strap shape formed of a metallic material and is attached on an outer periphery of the tubular seal. The second tube or the clamp has a tab, which is protruded in a radial direction. The tubular seal has a slit extending in the radial direction. The tab is engaged with and latched on the slit.

15 Claims, 8 Drawing Sheets

110 40 74b 64 48 60 74a 43 45 49 42 44 41 74c 122 30 38 43a 74 72 70

RADIAL
AXIAL

CLAMPED JOINT DEVICE

TECHNICAL FIELD

The present disclosure relates to a clamped joint device.

BACKGROUND

Conventionally, an internal combustion engine of a vehicle is equipped with a throttle valve for controlling intake air. In a conventional structure, the throttle valve is equipped to an intake passage through which the engine draws intake air into combustion chambers. In a conventional structure, the piston of the engine produces negative pressure when drawing intake air in an intake stroke, and the negative pressure is applied to a joint portion between the intake passage and the throttle valve.

In a turbocharged engine, a throttle valve may be located on the downstream side of a compressor of a turbocharger. In this configuration, the compressor produces a positive pressure to pressurize intake air and feeds the pressurized air through an intake passage into the throttle valve. Consequently, a joint portion between the intake passage and the throttle valve may be applied with the positive pressure. Consequently, leakage is concerned at the joint portion.

SUMMARY

According to an aspect of the preset disclosure, a tubular seal may be formed of an elastic material and may be equipped on an outer periphery of the first tube. A second tube may be inserted in the tubular seal and may be connected with the first tube via the tubular seal. A clamp in a strap shape may be formed of a metallic material and may be attached on an outer periphery of the tubular seal. One of the second tube and the clamp may have a tab, which is protruded in a radial direction. The tubular seal may have a slit extending in the radial direction. The tab may be engaged with and latched on the slit.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

As follows, a first embodiment of the present disclosure will be described with reference to drawings. In the description, an axial direction is along an arrow represented by "AXIAL" in drawing(s). A radial direction is along an arrow represented by "RADIAL" in drawing(s). A circumferential direction is along an arrow represented by "CIRCUMFERENTIAL" in drawing(s).

Figure 1:
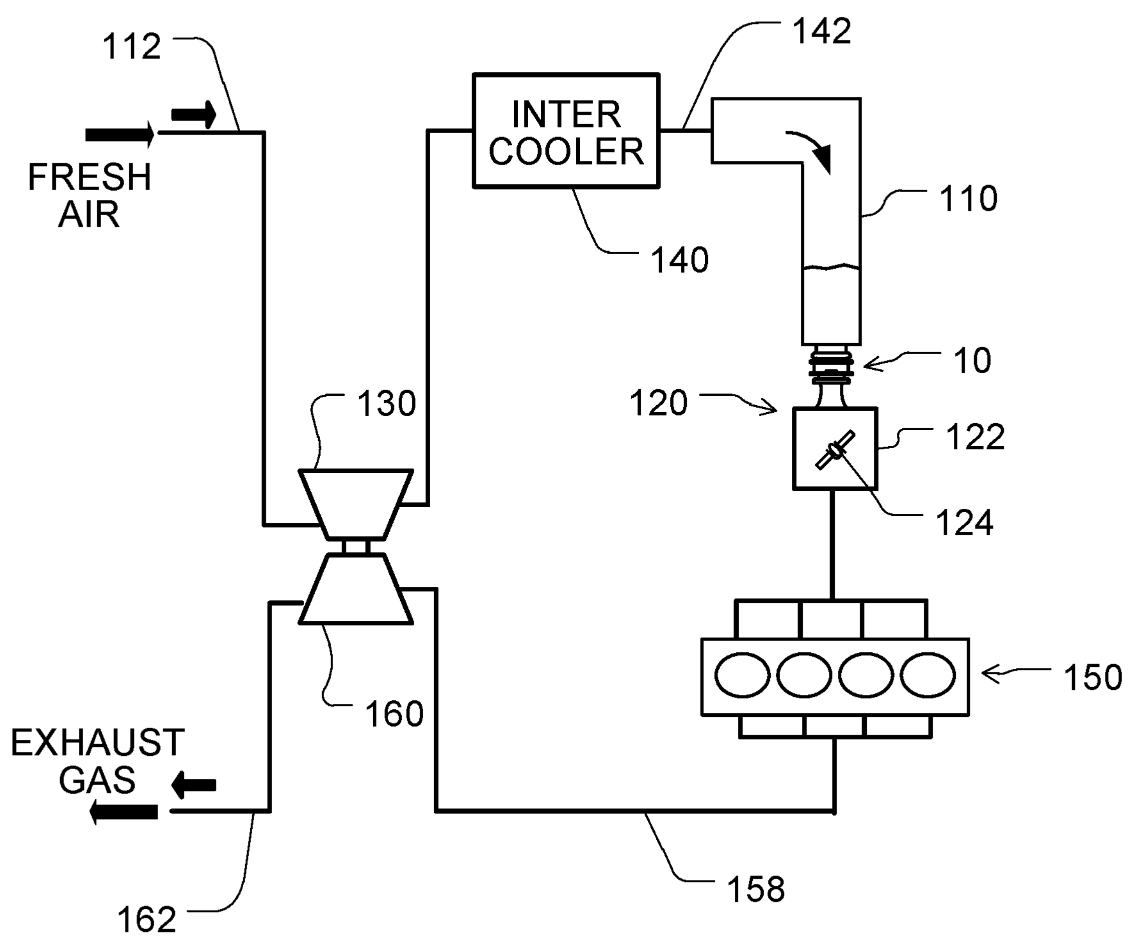
FIG. 1 is a block diagram showing an intake and exhaust system for an engine.

As shown FIG. 1, according to the present example, an internal combustion engine 150 is combined with an intake and exhaust system. The intake and exhaust system includes a turbocharger including a compressor 130 and a turbine 160, an intercooler 140, and a throttle valve 120. The compressor 130 is rotationally connected with the turbine 160 via a common axis.

An intake passage 112 is connected with the compressor 130. The compressor 130 is connected with the engine 150 through a charge air passage 142. The charge air passage 142 is equipped with the intercooler 140, a duct 110, and the throttle valve 120. The engine 150 is further connected with the turbine 160 through a combustion gas passage 158. The turbine 160 is connected with an exhaust passage 162.

The intake passage 112 feeds intake air from the outside of the vehicle. The compressor 130 is driven by the turbine 160 to compress intake air. The charge air passage 142 flows the compressed air to the engine 150. The intercooler 140 cools the compressed air. The throttle valve 120 regulates a quantity of air cooled with the intercooler 140.

The engine 150 burns air-fuel mixture and emits exhaust gas into the combustion gas passage 158. The combustion gas passage 158 flows the combustion gas into the turbine 160 to drive the compressor 130 thereby to cause the compressor 130 to compress intake air. The compressor 130 feeds the compressed air through the intercooler 140 and the throttle valve 120 into the engine 150. The exhaust passage 162 flows exhaust gas from the turbine 160 to the outside of the vehicle.

In the present configuration, the throttle valve 120 receives air compressed with the compressor 130. Therefore, the duct 110 and the throttle valve 120 are applied with positive internal pressure.

The duct 110 is a hollow member formed of, for example, resin such as Nylon, Polypropylene. The duct 110 internally forms a passage connected with the charge air passage 142 to flow charged air from the charge air passage 142 to the throttle valve 120. The throttle valve 120 includes a housing 122 and a valve body 124. The valve body 124 is rotationally accommodated in the housing 122 to regulate airflow passing through the housing 122. The housing 122 is formed of a metallic material such as aluminum alloy or Nylon.

Figure 2:
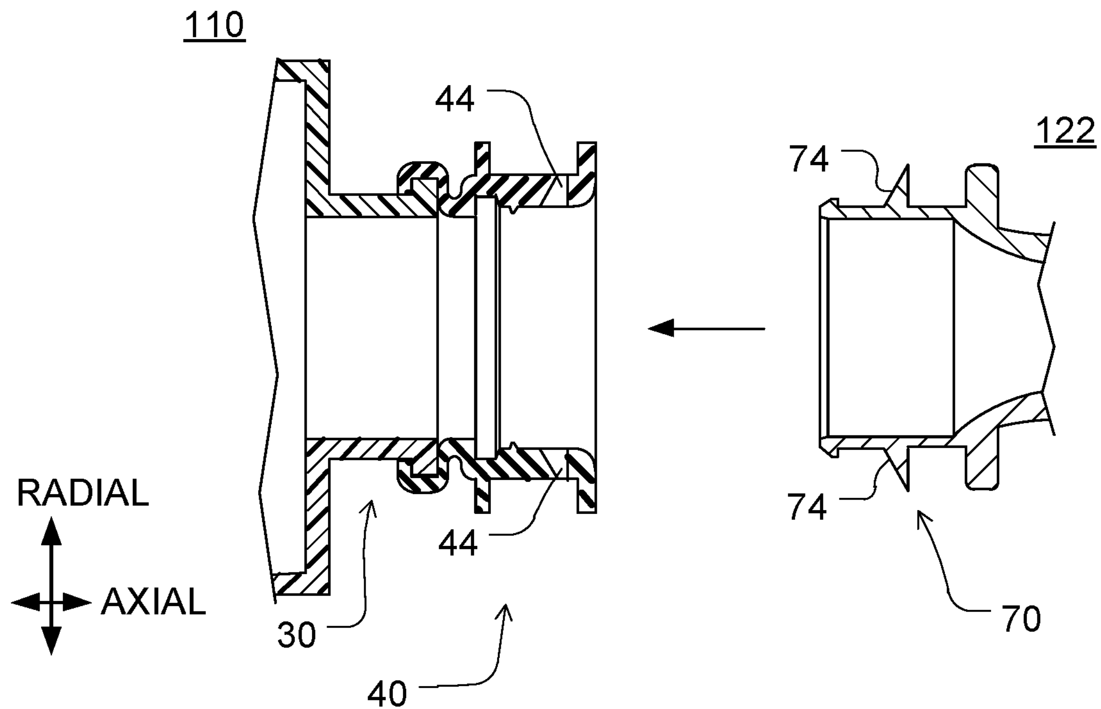
FIG. 2 is a sectional view showing a pipe, a tubular seal, and a sleeve, before the sleeve is inserted into a tubular seal.

The throttle valve 120 and the duct 110 are connected with each other via a joint device 10. As follows, the joint device 10 between the duct 110 and the throttle valve 120 will be described with reference to FIGS. 2 to 4. In FIG. 2, the joint device 10 includes a pipe 30, a tubular seal 40, and a sleeve 70. The pipe 30 may be a part of the duct 110. The sleeve 70 may be a part of the housing 122 of the throttle valve 120.

The pipe 30 is in a tubular shape. The tubular seal 40 is in a tubular shape formed of an elastic material such as a rubber material (elastomer). The tubular seal 40 is equipped on the outer periphery of the pipe 30. For example, the tubular seal 40 is over-molded on the outer periphery of the pipe 30, such that the tubular seal 40 is adhered on the pipe 30. The pipe 30 may be equivalent to a first pipe 30. The sleeve 70 is in a tubular shape. The sleeve 70 may be equivalent to a second pipe 30.

Figure 3:
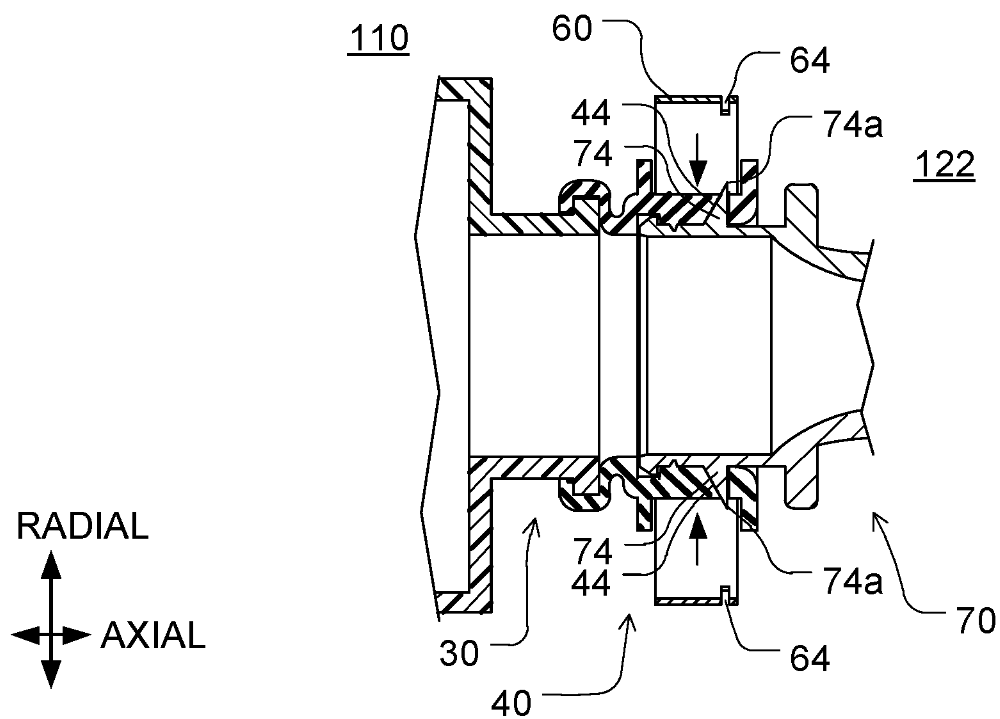
FIG. 3 is a sectional view showing the pipe and the sleeve after the sleeve is inserted into the tubular seal.
Figure 4:
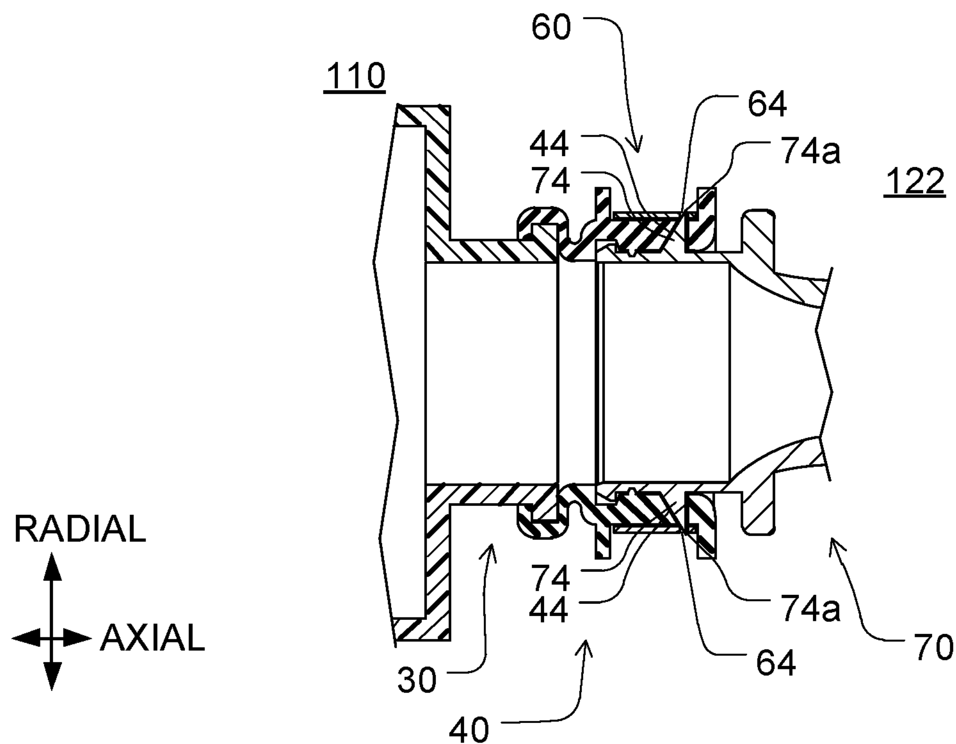
FIG. 4 is a sectional view showing the pipe and the sleeve after the sleeve is inserted into the tubular seal, and a clamp is being wrapped around the tubular seal.

In FIG. 2, the throttle valve 120 is coupled with the duct 110 by inserting the sleeve 70 into the tubular seal 40 in the direction shown by an arrow in FIG. 2. As shown in FIG. 3, a clamp 60 is attached on the outer periphery of the tubular seal 40. The clamp 60 is in an annular strap shape and is formed of metal. Thus, as shown in FIG. 4, the sleeve 70 is affixed to the pipe 30. In addition, the clamp 60 is wrapped around the outer periphery of the tubular seal 40 to securely tie the tubular seal 40 on the sleeve 70.

Referring back to FIG. 2, in the present embodiment, two tabs 74 are formed on the outer periphery of the sleeve 70. The two tabs 74 are located at opposite positions across the sleeve 70 in the radial direction. Each of the two tabs 74 is protruded from the sleeve 70 in the radial direction. The tab 74 has a cross section in a triangular shape.

The tubular seal 40 has two slits 44. In the present embodiment, each of the slits 44 is a through hole extending through the wall of the tubular seal 40. The slit 44 has a cross section in a triangular shape. The cross section of the slit 44 is substantially identical to the cross section of the tab 74.

In FIG. 3, when the sleeve 70 is inserted into the tubular seal 40, the tabs 74 are inserted into and engaged with the slits 44, respectively. Thus, the slits 44 are latched on and holed at the tabs 74, respectively. In the present state, the tab 74 extends through the slit 44. In addition, a tip end 74*a* of the tab 74 is exposed from the outer periphery of the tubular seal 40.

In the present state, the clamp 60 is equipped to the tubular seal 40. The clamp 60 has slots 64 each being a through hole in a rectangular shape. The clamp 60 is wrapped around the outer periphery of the tubular seal 40, such that the slots 64 are aligned with the tabs 74 in the circumferential direction.

Thus, in FIG. 4, the tabs 74 are engaged with the slots 64. The tab 74 extends through the slit 44 of the tubular seal 40 and the slot 64 of the clamp 60. The tip end 74*a* of the tab 74 is exposed from the clamp 60. Thus, the tab 74 is latched on both the slit 44 and the slot 64.

Figure 5:
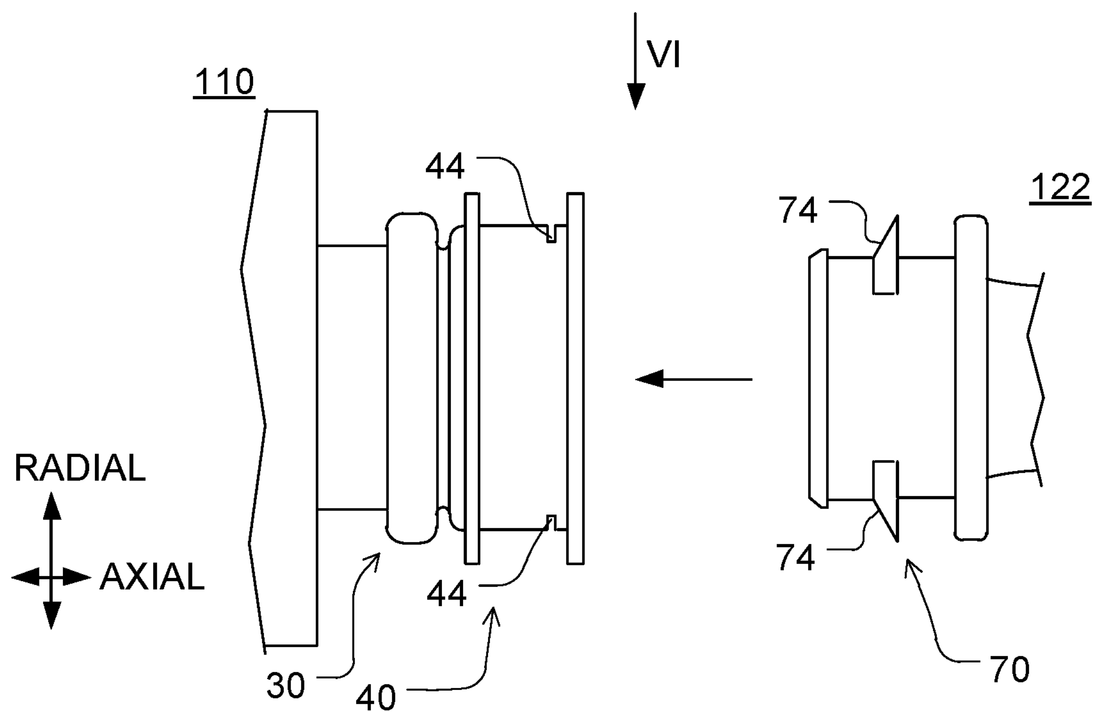
FIG. 5 is a side view showing the sleeve being inserted into the tubular seal.
Figure 6:
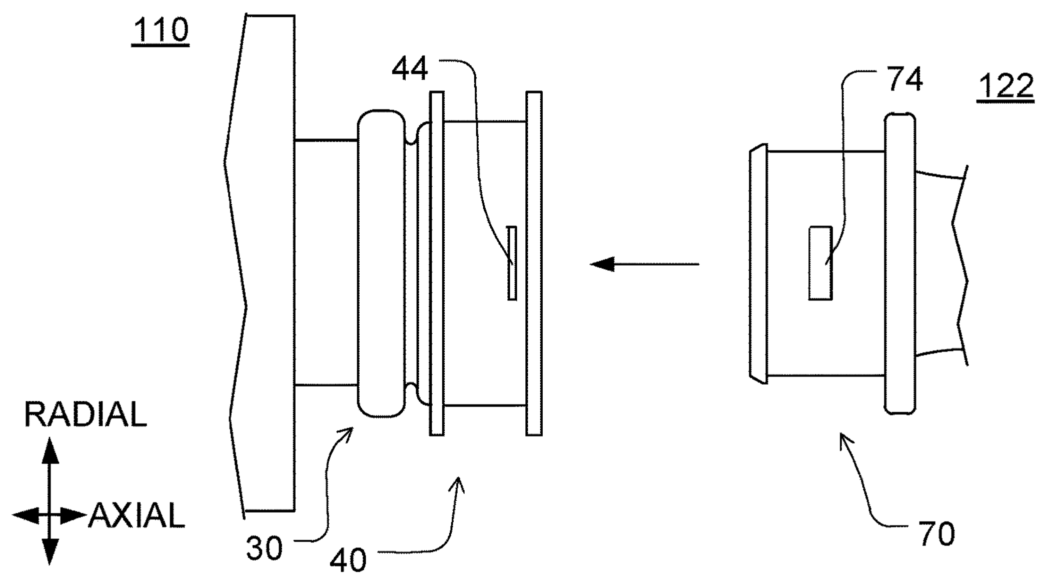
FIG. 6 is a top view showing the sleeve being inserted into the tubular seal.
Figure 7:
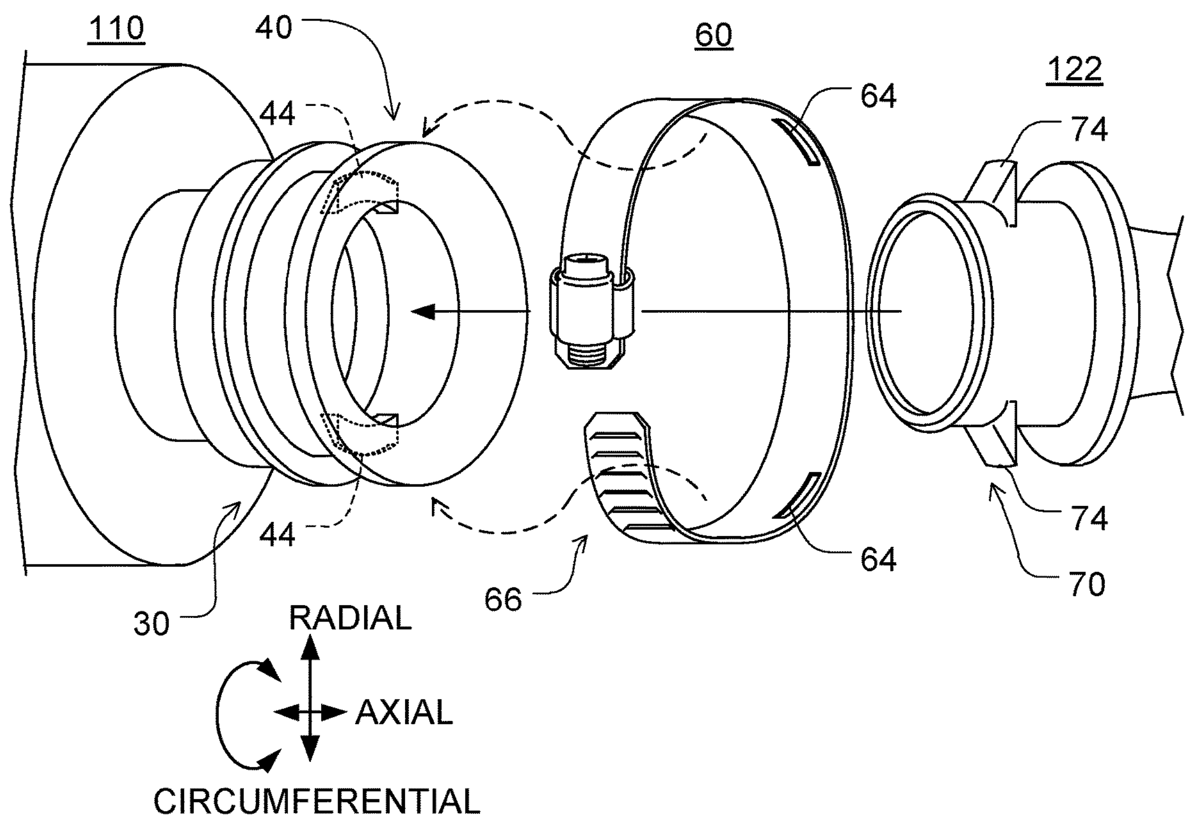
FIG. 7 is an exploded perspective view showing the sleeve, the tubular seal, the pipe, and the clamp.

FIGS. 5 to 7 show the exterior of the pipe 30, the tubular seal 40, and the sleeve 70. FIG. 6 is a top view when viewed along an arrow IV in FIG. 5. The tab 74 is in a rectangular shape in the top view. The slit 44 is in a rectangular shape forming a thin aperture on the outer periphery of the tubular seal 40.

In FIG. 7, the slit 44 extends in the circumferential direction for its length. The tip end 74*a* of the tab 74 is chamfered to have a curved outline along the curved outer periphery of the sleeve 70. The tab 74 extends in the circumferential direction for its length and is in a shape of a triangular columnar shape.

When the sleeve 70 is inserted into the tubular seal 40, the tubular seal 40 may be deformed and expanded radially outward to form a clearance thereby to enable the tabs 74 to pass through the opening of the tubular seal 40. in the state where the sleeve 70 is coupled with the pipe 30, the tab 74 is engaged with the slit 44 such that the slit 44 is occupied with the tab 74.

The clamp 60 is formed of a metallic material such as stainless steel. The clamp 60 may have a general hose clamp structure. In the present example, the clamp 60 includes a closing mechanism including a strap band, a screw, which is held by the strap band, and dents formed on the strap. When the clamp 60 is equipped to the tubular seal 40, an end of the strap is first inserted into the strap band, and the screw is engaged with the dents of the strap. Subsequently, the clamp 60 is squeezed by using a screwdriver to feed the strap into the strap band by utilizing the engagement structure between the screw and the dents on the strap. In this way, the clamp 60 is tightened onto the outer periphery of the tubular seal 40.

(Detail)

Figure 8:
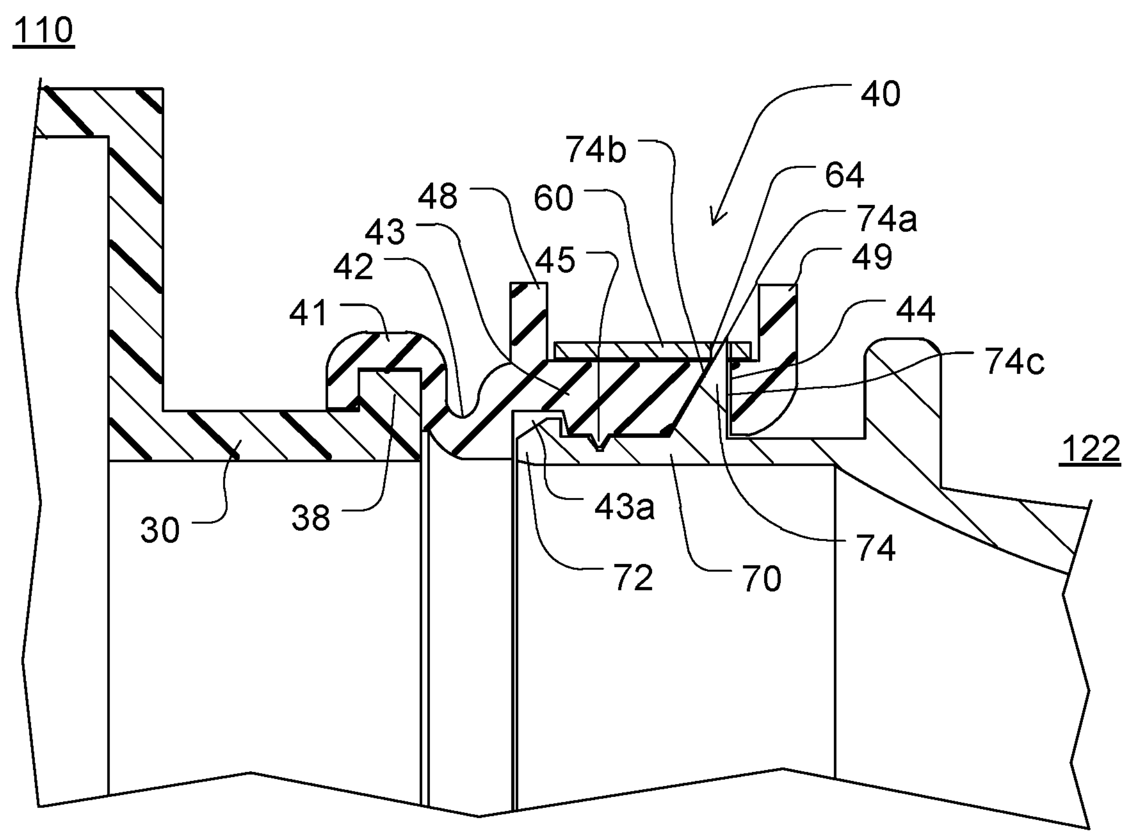
FIG. 8 is a sectional view showing the sleeve inserted into the tubular seal, and the clamp wrapped around the tubular seal, according to a first embodiment.
Figure 8:
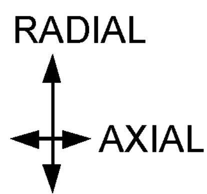

Subsequently, details of the joint device 10 will be described with reference to FIG. 8. In FIG. 8, the tab 74 has a cross section in a triangular shape. Specifically, the tab 74 has a tapered surface 74*b* and a perpendicular surface 74*c*. The tapered surface 74*b* is located on the side of a fore end 72 of the sleeve 70. The perpendicular surface 74*c* is located farther from the fore end 72 of the sleeve 70 than the tapered surface 74*b*. The tapered surface 74*b* is at an acute angle relative to the outer periphery of the sleeve 70. The perpendicular surface 74*c* is perpendicular to the outer periphery of the sleeve 70. That is, the perpendicular surface 74*c* is extended in the radial direction.

The tubular seal 40 is, for example, over-molded on the pipe 30. Specifically, the pipe 30 is first formed by, for example, injection molding of resin. Subsequently, the molded pipe 30 is placed in a molding die, and the tubular seal 40 is further formed by, for example, injection molding an elastic material on the outer periphery of the pipe 30. In this way, the pipe 30 is insert-molded with the tubular seal 40. More specifically, the pipe 30 has an end having a flange 38, which is in a ring shape extending radially outward. The tubular seal 40 has an over-molded portion 41, which is over-molded on the outer periphery of the flange 38 of the pipe 30 to surround both end surfaces of the flange 38 in the axial direction.

The tubular seal 40 further has a joint portion 42, a seal body 43, an intermediate ring 48, and an end ring 49.

The joint portion 42 joins the over-molded portion 41 with the seal body 43. The joint portion 42 is reduced in outer diameter and in thickness relative to the over-molded portion 41 and the seal body 43. The joint portion 42 forms a flexible structure at which the tubular seal 40 is bendable to permit offset alignment between the pipe 30 and the sleeve 70. The seal body 43 has a groove 43*a* dented radially outward. The seal body 43 has the slit 44 having the cross section in the triangular shape. The seal body 43 further has a bead 45 having a cross section in a triangular shape. The bead 45 extends radially inward from the inner surface of the seal body 43.

The sleeve 70 has a nipple at the fore end 72. The nipple is protruded radially outward. When the sleeve 70 is inserted into the pipe 30, the nipple of the sleeve 70 is engaged with the groove 43*a* of the seal body 43. In addition, the tab 74 of the sleeve 70 is engaged with the slit 44 of the seal body 43. Furthermore, the bead 45 is urged onto the outer surface of the sleeve 70. The bead 45 functions to seal against the outer surface of the sleeve 70.

The intermediate ring 48 and the end ring 49 are distant from each other in the axial direction. The intermediate ring 48 and the end ring 49 are protruded from the seal body 43 outward in the radial direction.

The seal body 43 has the outer periphery between the intermediate ring 48 and the end ring 49. In the state where the sleeve 70 is inserted into the pipe 30, the clamp 60 is wrapped around the outer periphery of the seal body 43, such that the clamp 60 is located between the intermediate ring 48 and the end ring 49 in the axial direction. The intermediate ring 48 and the end ring 49 restrains movement of the clamp 60 in the axial direction.

Further, when the clamp 60 is equipped to the outer periphery of the seal body 43, the slot 64 of the clamp 60 is aligned with the tab 74 of the sleeve 70, which is protruded through the slit 44 of the seal body 43. Thus, the perpendicular surface 74*c* of the tab 74 is engaged with an inner surface, which defines the slit 44 of the clamp 60. In the present structure, the tab 74, which is formed of a metallic material, is latched on the slot 64 of the clamp 60, which is also formed of a metallic material.

According to the present embodiment, the tab 74 of the sleeve 70 is latched on both the slit 44 of the tubular seal 40 and the slot 64 of the clamp 60. Therefore, the sleeve 70 is securely affixed to the tubular seal 40. In addition, the clamp 60 is also configured to apply a radial force inward to the tubular seal 40 thereby to maintain the over-molded tubular seal 40 to the housing 122 under positive pressure. The present joint structure may avoid detachment of the sleeve 70 from the pipe 30 even when positive pressure is applied inside the joint structure.

Second Embodiment

Figure 9:
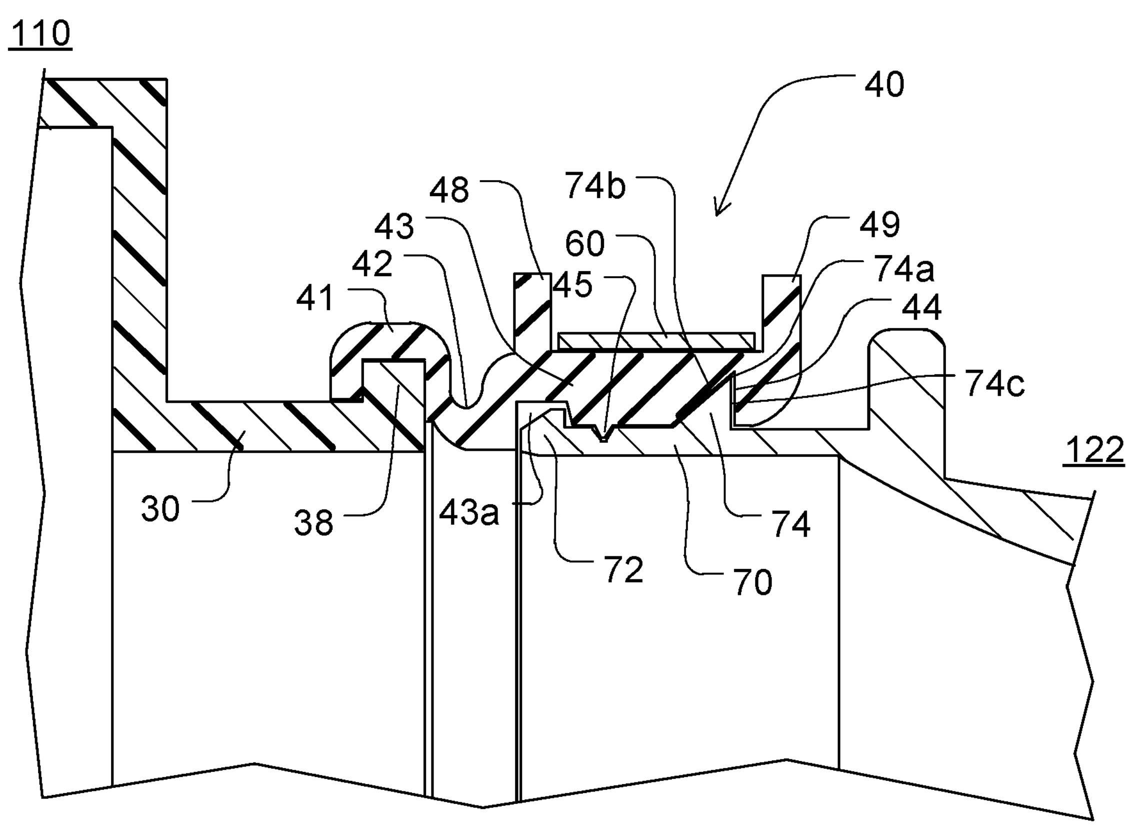
FIG. 9 is a sectional view showing the sleeve inserted into the tubular seal, and the clamp wrapped around the tubular seal, according to a second embodiment.
Figure 9:
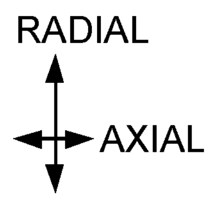

As shown in FIG. 9, according to a second embodiment, the slit 44 is a recess closed at one end on the radially outside. That is, the slit 44 is not a through hole. The tab 74 is protruded from the outer periphery of the sleeve 70 into the slit 44. In the present embodiment, the tip end 74*a* of the tab 74 is covered with the tubular seal 40. In addition, the clamp 60 does not have the slot 64. In the present structure, the tab 74 is latched on the slit 44 of the tubular seal 40. The present configuration may not need alignment of the slot 64 relative to the tab 74 when the clamp 60 is equipped to the outer periphery of the tubular seal 40.

Third Embodiment

Figure 10:
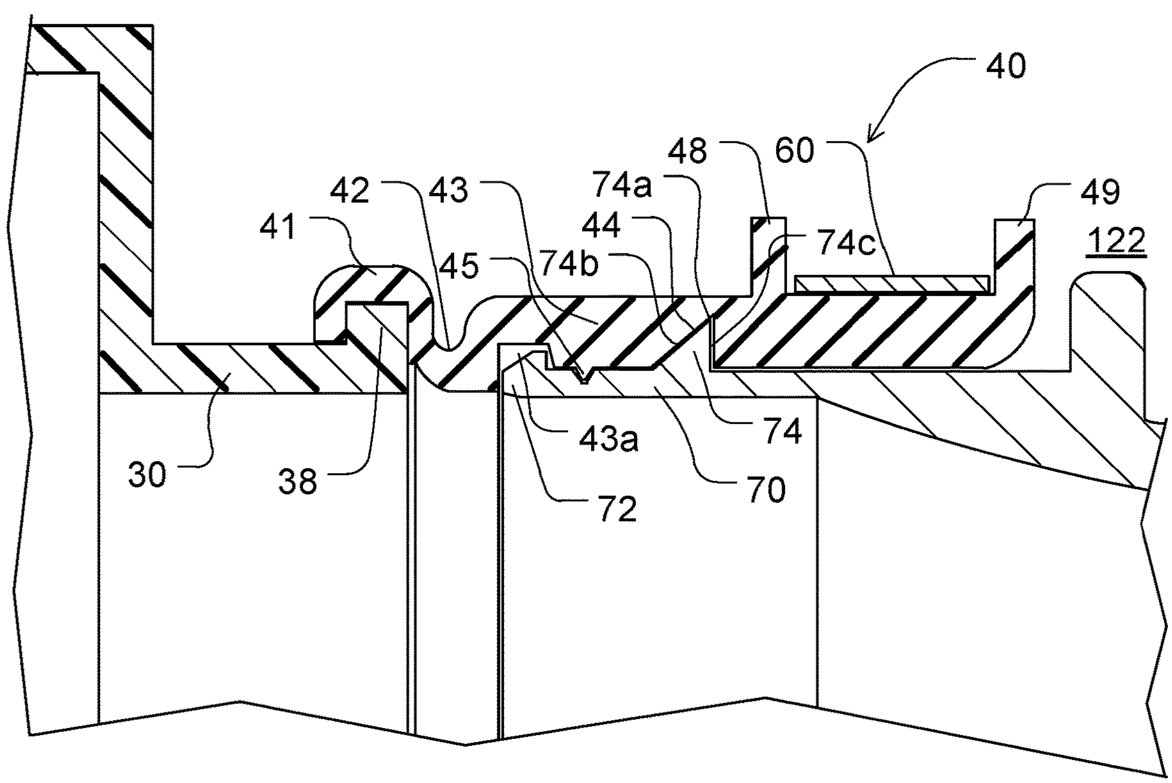
FIG. 10 is a sectional view showing the sleeve inserted into the tubular seal, and the clamp wrapped around the tubular seal, according to a third embodiment.
Figure 10:
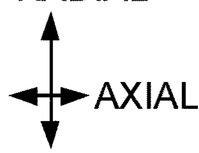

As shown in FIG. 10, according to a third embodiment, the seal body 43 has the slit 44, which is shifted from the position of the outer periphery of the tubular seal 40, which is between the intermediate ring 48 and the end ring 49, in the axial direction. When the sleeve 70 is inserted into the pipe 30, the tab 74 is latched on the slit 44 of the seal body 43, such that the tab 74 is located at a position away from the clamp 60 in the axial direction. In the present state, the tab 74 is shifted from the clamp 60 in the axial direction. The clamp 60 is further equipped to the outer periphery of the seal body 43 at the position between the intermediate ring 48 and the end ring 49. Thus, the clamp 60 is tightened on the seal body 43 on the opposite side of the tab 74 and the slit 44 from the tip end 74*a* (nipple) of the sleeve 70. The present configuration may enable to apply force radially inward on the root side of the sleeve 70 relative to the tab 74.

When a positive pressure is applied inside the sleeve 70 and the tubular seal 40, a detaching force may be applied in the axial direction to pull the sleeve 70 off from the tubular seal 40. In this situation, the detaching force may act to move the tab 74 rightward in the drawing toward a portion of the tubular seal 40, which is tightened from the clamp 60 radially inward. That is, the clamp 60 securely tightens the tubular seal 40 on the root side of the sleeve 70 to prohibit movement of the tab 74 beyond the claim 60 in the axial direction. Therefore, the application of the force from the clamp 60 radially inward to the tubular seal 40 may be effective to avoid detachment of the sleeve 70 from the tubular seal 40.

Fourth Embodiment

Figure 11:
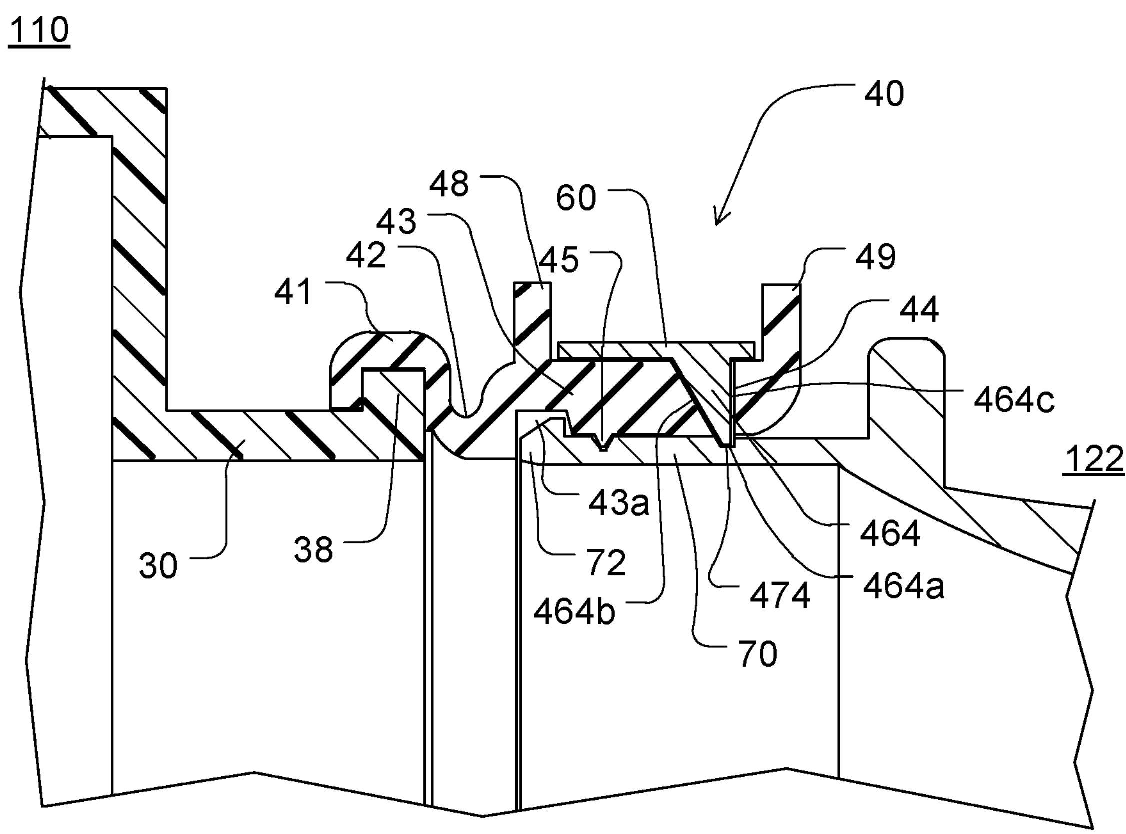
FIG. 11 is a sectional view showing the sleeve inserted into the tubular seal, and the clamp wrapped around the tubular seal, according to a fourth embodiment.
Figure 11:
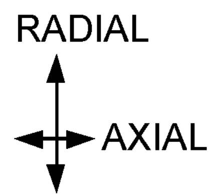

As shown in FIG. 11, according to a fourth embodiment, the clamp 60 has a tab 464 protruding from the inner periphery radially inward into the slit 44 of the tubular seal 40. A tip end 464*a* of the tab 464 extends through the slit 44 into an outer groove 474 of the sleeve 70. Each of the tab 464 of the clamp 60 and the slit 44 of the seal body 43 has a cross section in a triangular shape reducing in width in the axial direction radially inward. The tab 464 has a tapered surface 464*b* and perpendicular surface 464*c*. When viewed from the radially inside, each of the tab 464, the slit 44, and the outer groove 474 is, for example, in a rectangular shape and extending in the circumferential direction.

In the present configuration, the perpendicular surface 464*c* of the tab 464 is latched on both the slit 44 and the outer groove 474 of the sleeve 70. In particular, the tab 464, which is formed of a metallic material, is in contact at the perpendicular surface 464*c* on the inner surface of the outer groove 474 of the sleeve 70, which is formed of a metallic material.

Other Embodiment

The number of the tabs, the slits, and the slots may be arbitrarily determined. The tabs 74 may be located along the periphery of the sleeve 70 at a constant angle $\theta_a$. For example, in a configuration including three tabs 74, the three tabs 74 may be arranged at an annular intervals of 120 degrees. The number of the tabs 74 may be four, five, six, or more.

The closing mechanism of the clamp 60 is not limited to the combination of a screw and the strap having dents. The clamp 60 may have a one-touch coupling structure including levers. In this case, the clamp 60 may be widened in diameter by pinching the levers when the tubular seal 40 is inserted into the clamp 60. Subsequently, the clamp 60 may be fitted to the outer periphery of the tubular seal 40 by releasing the levers of the clamp 60.

The width of the slot 64 in the circumferential direction may be greater than the width of the tab 74 in the circumferential direction. This structure may facilitate alignment of the slot 64 relative to the tab 74 when the clamp 60 is equipped on the tubular seal 40.

The sleeve 70 may be over-molded with the tubular seal 40 to form the hose structure including the flexible joint. In this case, the tubular seal 40 of the sleeve 70 may have the slit 44, and the pipe 30 may have the tab 74. The pipe 30 may not have the tubular seal 40 and the hose structure.

The slot 64 may be a dent closed at the outer circumferential periphery. In this case, the tip end 74*a* of the tab 74 may not be exposed from the clamp 60 through the slot 64.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A joint device comprising:
a first tube having a flange at an end;
a second tube;
a tubular seal connecting the first tube and the second tube; and
a clamp attached on an outer periphery of the tubular seal, wherein the tubular seal has
a first end portion engaging with the flange of the first tube,
a second end portion retaining the second tube therein, and
an intermediate portion located between the first end portion and the second end portion along an axial direction of the tubular seal,
the first tube and the second tube are distanced from each other along the axial direction with the intermediate portion of the tubular seal being interposed between the first tube and the second tube,
the clamp is positioned on the second end portion of the tubular seal with the second end portion of the tubular seal being interposed between the clamp and the second tube,
the second tube or the clamp has a tab protruding along a radial direction of the tubular seal toward the other of the second tube or the clamp,
the other of the second tube or the clamp has a slot facing the tab along the radial direction,
the tubular seal has a slit passing through the tubular seal along the radial direction,
the tab passes through the slit of the tubular seal and extends into the slot of the other of the second tube or the clamp when the second tube is positioned inside the tubular seal, and
the end of the first tube having the flange is a distal end of the first tube along the axial direction.

2. The joint device according to claim 1, wherein
the clamp has the slot and the second tube has the tab,
the slot and the tab are aligned with each other along a circumferential direction, and
the tab is engaged with the slot by inserting into the slot.

3. The joint device according to claim 2, wherein
the slot is a through hole,
the tab extends through both the slit and the slot, and
the tab has a tip end exposed from the slot.

4. The joint device according to claim 2, wherein
the tab has:
a perpendicular surface extending along the radial direction from an outer surface of the second tube; and
a tapered surface located between a fore end of the second tube and the perpendicular surface along the axial direction, extending from the outer surface of the second tube to the perpendicular surface, and inclining with respect to the perpendicular surface at an acute angle,
the perpendicular surface and the tapered surface are connected to each other at a tip end of the tab so that the tab has a triangular shape in a cross section parallel to the axial direction, and
the tab is latched on both the slit of the tubular seal and the slot of the clamp at the perpendicular surface.

5. The joint device according to claim 1, wherein
the tab has:
a perpendicular surface extending along the radial direction from an outer surface of the second tube; and
a tapered surface located between a fore end of the second tube and the perpendicular surface along the axial direction, extending from the outer surface of the second tube to the perpendicular surface, and inclining with respect to the perpendicular surface at an acute angle,
the perpendicular surface and the tapered surface are connected to each other at a tip end of the tab so that the tab has a triangular shape in a cross section parallel to the axial direction, and
the tab is latched on the slit of the tubular seal at the perpendicular surface.

6. The joint device according to claim 1, wherein
the second tube has the tab protruding from an outer surface of the second tube radially outward into the slit.

7. The joint device according to claim 1, wherein
the slit is a through hole, and
the tab has a tip end protruded through the slit.

8. The joint device according to claim 1, wherein
the tubular seal has an intermediate ring and an end ring, which are distant from each other in the axial direction and are protruded radially outward,
the tubular seal has an outer periphery between the intermediate ring and the end ring in the axial direction, and
the clamp is equipped to the outer periphery of the tubular seal and is located between the intermediate ring and the end ring.

9. The joint device according to claim 1, wherein
the clamp has the tab protruding from an inner periphery radially inward into the slit.

10. The joint device according to claim 1, wherein
the tab is one of a plurality of tabs,
the slit is one of a plurality of slits, and
the tabs and the slits are arranged in a circumferential direction.

11. The joint device according to claim 10, wherein
the tabs and the slits are located at a constant angular interval.

12. The joint device according to claim 10, wherein
the second tube includes two tabs,
the tubular seal includes two slits,
the two tabs are located at opposite positions in the radial direction, and
the two slits are located at opposite positions in the radial direction.

13. The joint device according to claim 1, wherein
the flange of the first tube faces an end of the second tube along the axial direction, and
the intermediate portion of the tubular seal is inserted between the flange of the first tube and the end of the second tube along the axial direction.

14. The joint device according to claim 13, wherein
the end of the second tube facing the flange of the first tube includes a flange,
the second end portion of the tubular seal has an inner surface facing the second tube, the inner surface includes a groove recessed along the radial direction away from the second tube, and the flange at the end of the second tube is located in the groove of the second end portion of the tubular seal.

15. The joint device according to claim 1, wherein the flange extends along the radial direction from a rim of the first tube.

* * * * *